(12) United States Patent
Saarnivala et al.

(10) Patent No.: US 12,058,197 B2
(45) Date of Patent: Aug. 6, 2024

(54) MESSAGE EXCHANGE BETWEEN CLIENT AND SERVER

(71) Applicants: Arm Limited, Cambridge (GB); Arm IP Limited, Cambridge (GB)

(72) Inventors: Mikko Johannes Saarnivala, Cambridge (GB); Szymon Sasin, Cambridge (GB); Yongbeom Pak, Cambridge (GB); Hannes Tschofenig, Cambridge (GB)

(73) Assignees: Arm Limited., Cambridge (GB); Arm IP Limited, Cambridge (GB)

(*) Notice: Subject to any disclaimer, the term of this patent is extended or adjusted under 35 U.S.C. 154(b) by 52 days.

(21) Appl. No.: 17/310,283

(22) PCT Filed: Dec. 13, 2019

(86) PCT No.: PCT/EP2019/085145
§ 371 (c)(1),
(2) Date: Jul. 27, 2021

(87) PCT Pub. No.: WO2020/156728
PCT Pub. Date: Aug. 6, 2020

(65) Prior Publication Data
US 2022/0182436 A1 Jun. 9, 2022

(30) Foreign Application Priority Data
Feb. 1, 2019 (GB) ..................... 1901450

(51) Int. Cl.
*H04L 67/025* (2022.01)
*G06F 11/30* (2006.01)
(Continued)

(52) U.S. Cl.
CPC ........ *H04L 67/025* (2013.01); *G06F 11/3082* (2013.01); *H04L 67/01* (2022.05); *H04L 67/12* (2013.01)

(58) Field of Classification Search
CPC ....... H04L 67/025; H04L 67/01; H04L 67/12; G06F 11/3082
See application file for complete search history.

(56) References Cited

U.S. PATENT DOCUMENTS

2010/0083263 A1   4/2010  Machida
2019/0007928 A1*  1/2019  Di Girolamo ........ H04W 24/08
2019/0238536 A1*  8/2019  Chilla ................. H04L 63/0823

FOREIGN PATENT DOCUMENTS

EP   2950497        12/2015
EP   3672204        6/2020
WO   2014/114354 A1  7/2014

OTHER PUBLICATIONS

GB Combined Search and Examination Report for GB1901450.5 dated Aug. 19, 2019.
(Continued)

*Primary Examiner* — Normin Abedin
(74) *Attorney, Agent, or Firm* — DeWitt LLP (57) ABSTRACT

A method implemented e.g. in a Lightweight Machine-to-Machine (LwM2M) server, comprises establishing a secure communication session with a client and transmitting an observation request to the client. The observation request identifies a first resource at the client, one or more criteria relating to the first resource to trigger a notification to be transmitted from the client to the server, and one or more resources at the client comprising at least one resource other than the first resource, the value of which is to be included in the notification.

15 Claims, 7 Drawing Sheets

(51) Int. Cl.
　　　*H04L 67/01*　　　(2022.01)
　　　*H04L 67/12*　　　(2022.01)

(56) References Cited

OTHER PUBLICATIONS

GB Examination Report for GB1901450.5 dated Jun. 17, 2021.
International Search Report and Written Opinion for PCT/EP2019085145 dated Mar. 30, 2021.
International Preliminary Report on Patentability (IPRP) for PCT/EP2019085145 dated Aug. 12, 2021.
ETSI TS 102 690 V1.1.1. Machine-to-Machine communications (M2M) Functional architecture, by European Telecommunications Standards Institute (ETSI). XP014068027. (2011).
Karaagac Abdulkadir, et al., "Extensions to LwM2M for Intermittent Connectivity and Improved Efficiency", 2018 IEEE Conference on Standards for Communications and Networking (CSCN), IEEE, Oct. 29, 2018 (Oct. 29, 2018), pp. 1-6; whole document.
OMA. LwM2M Technical Specification, Approved Version 1.0.2. Feb. 2018. URL: http://www.openmobilealliance.org/release/LightweightM2M/V1 0 2-20180209-A/.
OMA SpecWorks. Lightweight Machine to Machine Technical Specification: Core, Approved Version 1.1. Jul. 2018. URL: http://www.openmobilealliance.org/release/LightweightM2M/V1 1-20180710-A.
OMA SpecWorks. Lightweight Machine to Machine Technical Specification: Transport Bindings, Approved Version 1.1. Jul. 2018. URL: http://www.openmobilealliance.org/release/LightweightM2M/V1 1-20180710-A.

* cited by examiner

MESSAGE EXCHANGE BETWEEN CLIENT AND SERVER

This disclosure relates generally to the management of messages exchanged between a server and a client, for example but not limited to a server and client operating according to the Open Mobile Alliance (OMA) Lightweight Machine to Machine (LwM2M) protocol.

LwM2M is a device management protocol designed for sensor networks operating in an M2M environment such as but not limited to the Internet of Things (IoT). References in this disclosure to operation according to the LwM2M protocol are to be taken to mean compliant with standard OMA-ETS-LightweightM2M-V1.0 or any subsequent versions, for example:

OMA. LwM2M Technical Specification, Approved Version 1.0.2. February 2018. URL: http://www.openmobilealliance.org/release/LightweightM2M/V1_0_2-20180209-A/.

OMA SpecWorks. Lightweight Machine to Machine Technical Specification: Core, Approved Version 1.1. July 2018. URL: http://www.openmobilealliance.org/release/LightweightM2M/V1_1-20180710-A/.

OMA SpecWorks. Lightweight Machine to Machine Technical Specification: Transport Bindings, Approved Version 1.1. July 2018. URL: http://www.openmobilealliance.org/release/LightweightM2M/V1_1-20180710-A/.

The Internet of Things encompasses devices and networks that are internet protocol (IP)-enabled and Internet-connected, along with the Internet services monitoring and controlling those devices. Such IP-enabled devices connected to the internet may be termed data processing devices, end nodes, remote devices or Internet of Things (IoT) devices and include sensors, machines, active positioning tags, radio-frequency identification (RFID) readers and building automation equipment to name but a few. Data exchange between programs, computers and M2M devices is a vital element of the IoT and different programs, computers and processors are used in different environments.

The Wireless Embedded Internet is a subset of the IoT and is generally represented by resource-limited embedded devices, often battery powered and connected by low-power, low-bandwidth wireless networks to the Internet.

This disclosure is not limited to communication with IoT devices or devices operating according to Internet Protocol (IP) and may be applied to non-IP devices and communication.

An example of a network technology where Machine-to-Machine (M2M) communication is widely applied is a low-power wireless network, such as an IEEE 802.15.4 based embedded and sensor network. More recently, as M2M devices have become IP enabled, systems have become more open by using IP as a networking protocol. The sensors in a network are examples of objects in a communication system capable of reporting the values of resources such as temperature as described further herein. A server may initiate an observation request for changes of a specific resource. A client may then reply with a series of notifications, for example relating to temperature changes according to the observation request.

Following the introduction of IEEE 802.15.4 other standards were developed to standardize an IP adaption for such wireless embedded links. For example, the IPv6 over Low Power Wireless Standard (6LoWPAN) is a set of standards which enable the efficient use of IPv6 over low-power, low-rate wireless networks on simple embedded devices through an adaption layer and the optimization of related protocols.

The Open Mobile Alliance LwM2M is a standard applicable to 6LoWPAN and is focussed on constrained cellular and M2M devices. A Lightweight Machine-to-Machine (LWM2M) Bootstrap process is used to provide mandatory information through the Bootstrap Interface for remote devices so that they can perform registration with one or more servers. Registration assigns a remote device to a cloud based server to access applications across a domain.

A domain may be a logical grouping of devices and when the domain is exported to Domain Name System (DNS), then the domain value normally equates to the DNS domain name.

With the proliferation of IoT devices, it is desirable to manage such devices to ensure that they do not consume network resources unnecessarily. Some of the methods and apparatus described here are intended to reduce the number of messages, e.g. notifications, transmitted by clients. Not all of the methods and apparatus, e.g. computing systems and devices, described here are directed to this aim.

Some of the methods and apparatus described here utilize an observation request which identifies a first resource at a client and one or more criteria relating to the first resource to trigger a notification to be transmitted from the client to a server, e.g. a LwM2M server. The notification may or may not include the value of the first resource. The observation request may further identify one or more resources at the client device, the value of which is to be included in the notification. The one or more resources may comprise a resource other than the first resource. Thus a value from another resource may be "batched" with a notification triggered by a criterion applied to the first resource. It is not essential for all of this information to be comprised in the same observation request, and therefore any of the observation requests described herein may be replaced by a plurality of observation requests collectively comprising the same information. It will be therefore be appreciated that the term "batch" as used herein does not necessarily mean that values for multiple resources are reported in the same notification, although this is the case with some of the notifications described here.

In some aspects, methods and apparatus are disclosed here for recognizing resources whose values may be included in the same notification. Such methods may be implemented in a client or a server.

Some embodiments of methods and apparatus using the observation request will now be described by way of example only and with reference to the accompanying drawings in which.

The embodiments utilize the LwM2M protocol as an example but the methods and apparatus described herein are not limited to LwM2M.

Figure 1:
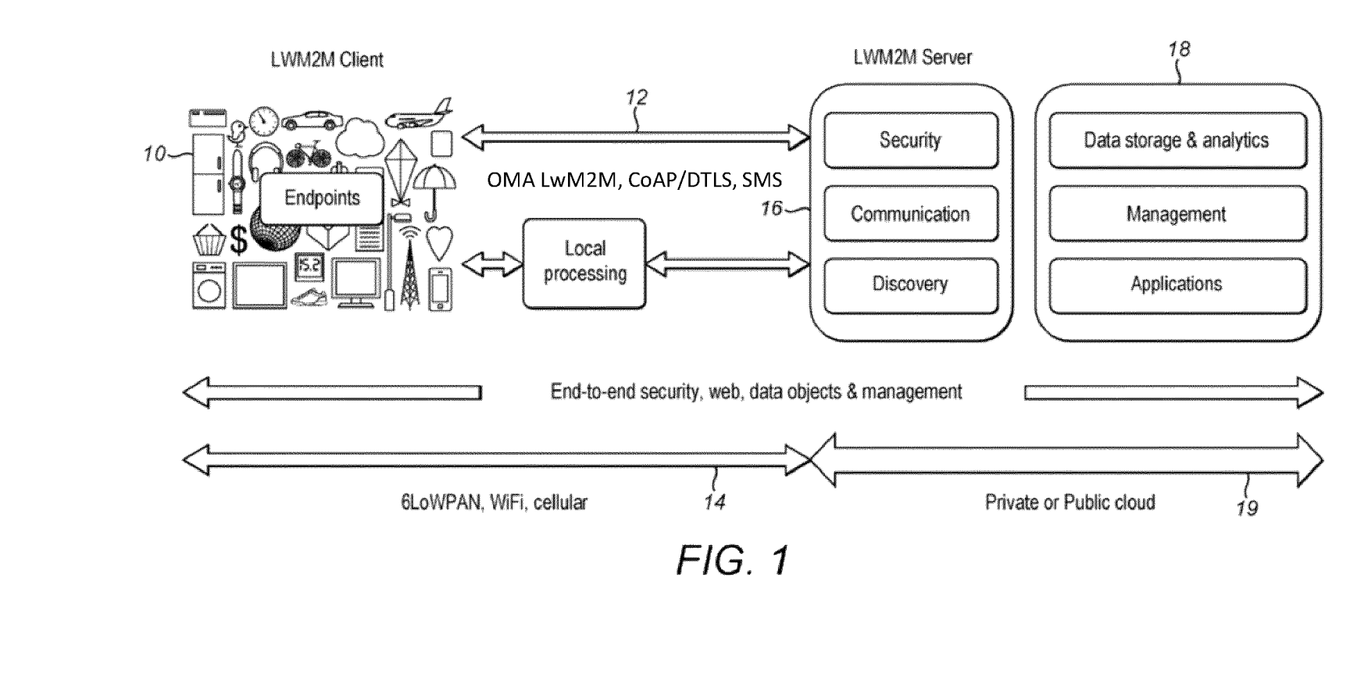
FIG. 1 is a schematic diagram of a LWM2M deployment scenario.

FIG. 1 shows a deployment scenario for an M2M remote device 10 across a range of market segments from streetlights and electric meters to home and building automation. The remote devices 10 may interface 12 with a LwM2M server 16 based on open Internet Engineering Task Force (IETF) standards such as Constrained Application Protocol (CoAP) over a low-power wireless network. One such low-power wireless network is an IEEE 802.15.4 based embedded and sensor network using IPv6 over Low Power Wireless Standard (6LoWPAN) 14. The LwM2M server 16 can interface with the wider world-wide web network 18 enabling deployment of M2M applications from a private server, private cloud or public cloud environment 19.

Figure 2:
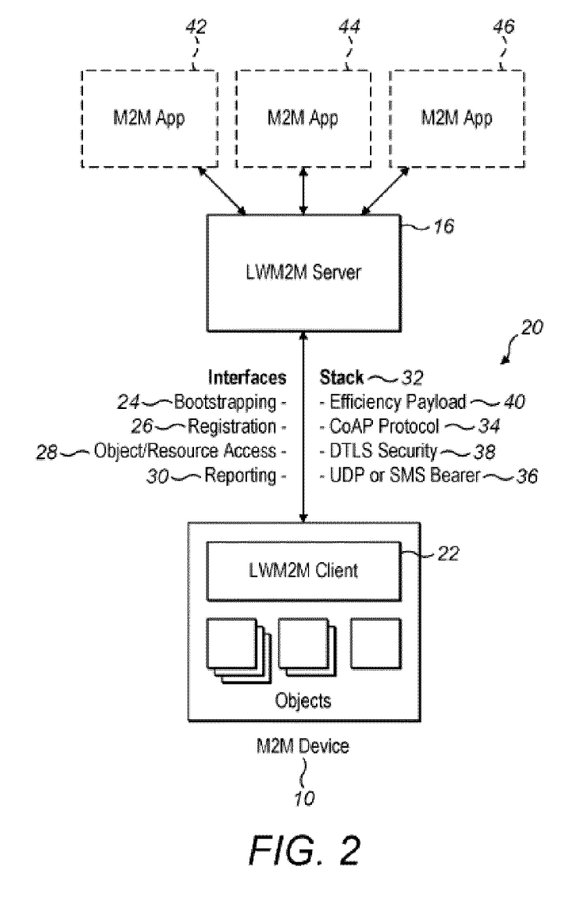
FIG. 2 is a schematic diagram of a LWM2M architecture with Server and Client.
Figure 3:
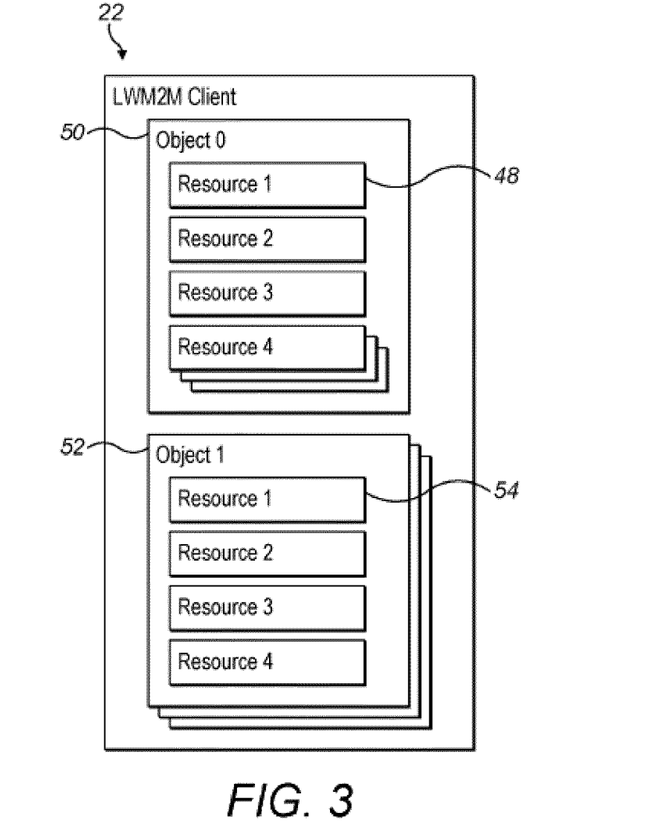
FIG. 3 is a schematic diagram of a LWM2M object model.

FIGS. 2 and 3 show the LwM2M architecture 20 which technically defines the application layer communication protocol for use between a client 22 on the M2M remote device 10 and server software on a LwM2M server 16. The client and server identified in FIGS. 1, 2 and 3 may comprise software operating at a client device and a server computing system respectively. In other words the terms "client" and "server" denote the algorithms operating at a respective device or computing system. A client device may comprise a computing system. A computing system as referred to in this disclosure may comprise memory, a processor programmed to implement any of the methods described here, input and output devices and optionally a user interface, as is known in the art.

The client 22 of FIG. 2 resides on the device 10 and is integrated as a software library or a built-in function of a module or device 10. The server 16 is located in a private or public data center and can be hosted by the M2M Service Provider, Network Service Provider or Application Service Provider.

As shown in FIG. 2, four logical interfaces are defined between the server and client, namely bootstrapping 24, being pre-provisioned or client/server initiated; registration 26 to register a client 22 and its objects 50; object/resource access or device management 28 to enable server 16 access to an object 50 or resource 48; and information reporting 30 for notifications with new resource 48 values. A LwM2M server may initiate an observation request for changes of a specific resource, resources within an object instance or for all the object instances of an object within a LwM2M client. The LwM2M client then replies with a series of notifications. The observation and notification mechanism used in LwM2M communications is defined in IETF standard RFC 7641 and updated in RFC8323. However the methods and apparatus described here are not limited to the use of these standards.

The LWM2M protocol stack 32 uses the Constrained Application Protocol (CoAP) 34 as the underlying transfer protocol over any suitable bearer 36 such as User Datagram Protocol (UDP), Transmission Control Protocol (TCP) and Short Message Server (SMS). The CoAP protocol 34 defines the message header, request/response codes, message options and retransmission mechanisms. The CoAP protocol 34 is an alternative to HTTP for Representational State Transfer (RESTful) Application Programming Interfaces (APIs) on resource-constrained devices 10 and supports the methods of GET, POST, PUT, DELETE, which can be mapped to those of HTTP. Unlike HTTP, CoAP messages are exchanged asynchronously between CoAP end-points over a datagram-oriented transport such as UDP. CoAP messages are encoded in a binary format allowing functionality to start with a 4-byte overhead. LWM2M defines the UDP Binding with CoAP as mandatory whereas the SMS Binding with CoAP is optional, which in effect means that LWM2M client 22 to server 16 interaction may occur both via SMS and UDP 36.

The LWM2M architecture 20 uses security protocols to secure communications between client 22 and server 16 using a Datagram Transport Layer Security (DTLS) 38. DTLS 38 is used to provide a secure channel between the LWM2M server 16 and the LWM2M client 22 for all efficient payloads 40. The efficient payloads 40 can be plain text for individual resources and Binary TLV or JSON for resource batches (Object or Resource Arrays). DTLS 38 security modes include both pre-shared key and public key technology to support embedded devices 10.

M2M application 42 developers can manage the devices 10 remotely through a M2M web application 44 and a M2M device management application 46.

A LwM2M client typically comprises software running on an IoT device implementing the LwM2M protocol for interaction with an LwM2M server and an LwM2M Bootstrap server. However the term "client" as used herein to denote software is not limited in this way and may comprise software operable on an IoT device for interaction with any LwM2M compliant server, including but not limited to an application server and a device management server. A LwM2M server typically comprises software implementing the server-side functionality of the LwM2M protocol for interaction with a LwM2M client. Typically, the LwM2M server software is running on a non-IoT device, such as an on-premise server or in a public or cloud-based infrastructure.

The LwM2M protocol accesses data on a device whereby the data itself is structured in a hierarchy. Each client device may have one or more "resources" associated with it, defined in the LwM2M standard. The term "resource" may refer to any variable or parameter associated with the client device that has a value, that may be reported to the server. Resources may be grouped into "objects" also defined in the LwM2M standard. An object may comprise resources having a similar origin. For example a sensor object may include a plurality of resources detectable by one or more sensors including but not limited to temperature, humidity, pressure, force. A system object may include system related resources such as memory usage, transmission success (positive or negative), alert generated (positive or negative). Resources may be grouped into objects in any way and the grouping is not limited to these examples. A device can potentially host multiple instances of the same object type. For example, if the object is "sensor", different sensor object instances may relate to different sensors such as temperature sensor, voltage sensor and other sensors. Similarly, resources may also occur in multiple instances.

Referring to FIG. 3, the client 22 illustrated in FIG. 2 is shown in more detail. Each piece of information made available by the LWM2M client 22 is a Resource 48. A Resource 48 may be considered to be a piece of information that can be read, written or executed and is accessed with URIs:
/{Object ID}/{Object Instance]/[Resource ID}, for example /3/0/1 (Device Object, Manufacturer Resource).

The Resources 48 are further logically organized into Objects 50. Each LWM2M client 22 can have any number of Resources 48, each of which belongs to an Object 50. For example, a Firmware Object 52 may contain all the Resources 54 used for firmware update purposes.

Although not shown in FIG. 3, a set of objects for device management purposes may include:

Security object to handle security aspects between management servers 16 and the client 22 on the device 10;

Server object to define data and functions related to the management server 16;

Access control object to define for each of several permitted management servers 16 the access rights the servers 16 have for each data object on the client 22;

Device object to detail resources on the M2M device 10 related to device 10 specific information;

Location object to group those resources that provide information about the current location of the M2M device 10;

Connectivity object to group together resources on the M2M device 10 that assist in monitoring the status of a network connection; and Statistics object to group together resources on the M2M device 10 that hold statistical information about an existing network connection.

As an example, a device object may allow remote retrieval of device information such as manufacturer, model, power information, free memory and error information. Furthermore the device object may provide a resource for initiation of a remote reboot or factory reset.

Figure 4:
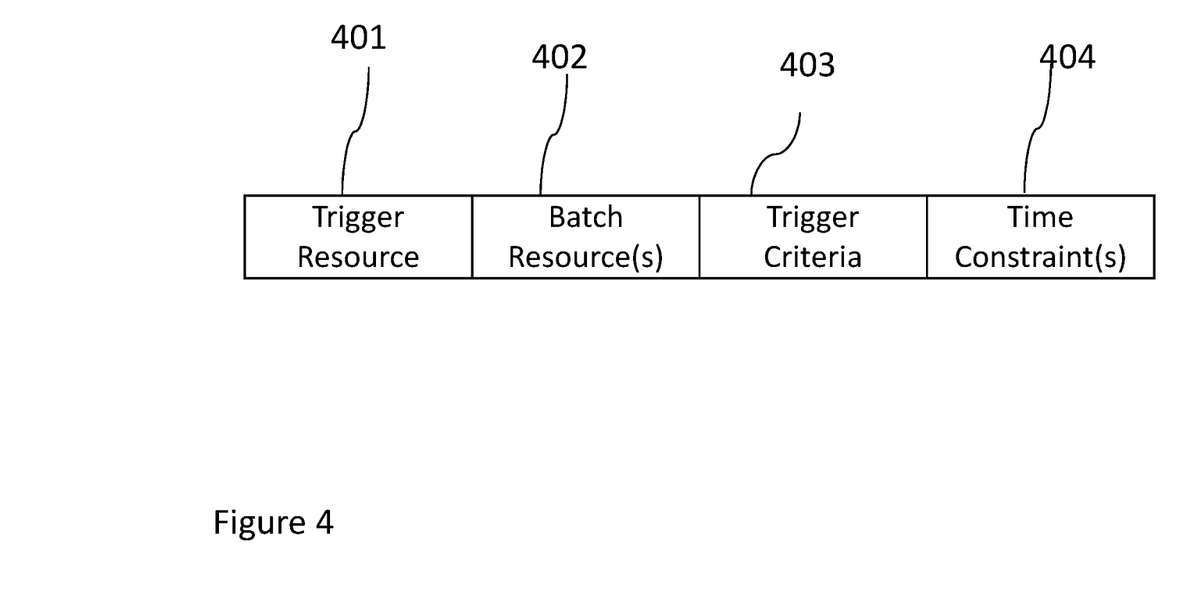
FIG. 4 shows a possible data structure that may be comprised in an observation request.

FIG. 4 shows a possible data structure that may be comprised in an observation request transmitted from a server to a client, for example in the context of the architecture shown in FIGS. 1-3. In the data structure of FIG. 4, four fields are included. The methods, systems and apparatus described here are not limited to the order of the fields shown in FIG. 4 and other possible data structures will be apparent to those skilled in the art. Other data may be included in an observation request in addition to the data described here and may be interspersed with the data described here. The data structure of FIG. 4 is described with reference to the architecture shown in FIGS. 1-3 but is not limited to this architecture. The fields shown in FIG. 4 are:

401—"Trigger resource"—this identifies a resource, e.g. resource 1, also referred to here as the "first" resource, of which a related criterion should trigger a notification from the client 22 to the server 16. The criterion may be determined for example by monitoring the resource, for example at a client device. An example of a criterion is a change in the value of the resource greater than a specified amount, e.g. absolute value or percentage. The notification may or may not include the value of the trigger resource.

402—"Batch resource(s)"—this identifies one or more resources at the client device, the value of which is to be included in the notification. The batch resource(s) include a resource other than the first or trigger resource. The batch resource(s) may or may not include the trigger or first resource.

403—"Trigger criteria"—this field comprises one or more criteria relating to the first or trigger resource to trigger a notification to be transmitted from the client device to the LwM2M server. For example a trigger criterion may define a value of the trigger resource, such as an absolute value, relative value (e.g. percentage), threshold or other, that would be used to trigger a notification.

404—"Time constraint"—this field may be provided to comprise time limitations placed on the triggering of a notification.

The fields listed above may alternatively be comprised in different observation requests which collectively define a request for information from the server to the client. Furthermore, the information in the individual fields may be distributed between corresponding fields in different observation requests. In both cases a request for information from the server to the client may be comprised in one or more observation requests. Therefore, in the following, instances of an observation request may be replaced by a plurality of observation requests.

It can be seen that an observation request as described here identifies at least two resources, namely the first or trigger resource and a resource other than the first resource whose value is to be included in the notification. Some embodiments of the observation request may identify two or more resources whose values are to be reported in the same notification, referred to herein as "batched". These resources may for example be identified in the batch resources field 402. This may reduce the number of notifications transmitted from the client 22 to the server 16. For example, in some embodiments, all of resources 1-4 of FIG. 3 may be "batched". As a result of the batching it may no longer be necessary for the client to transmit notifications to the server for each of the resources 1-4. Therefore, the frequency of notifications may be reduced by up to a factor of 4.

The observation request may additionally identify one or more criteria relating to a resource other than the first resource to trigger a notification to be transmitted from the client to the sever. This could be the resource whose value is to be reported, e.g. identified in the batch resource(s) field 402, or another resource. Therefore, in some embodiments, the trigger resource field 401 may identify one or more additional resources of which a related criterion should trigger a notification. In other words, other trigger resources may be identified in addition to a first trigger resource. Then the trigger criteria field 403 could include one or more criteria for each resource identified in the trigger resource field 401. Any resources identified in the trigger resource field 401 in addition to the first resource may also be identified in the batch resource(s) field 402 so that the values of those resources are reported in the same notification.

Figure 5:
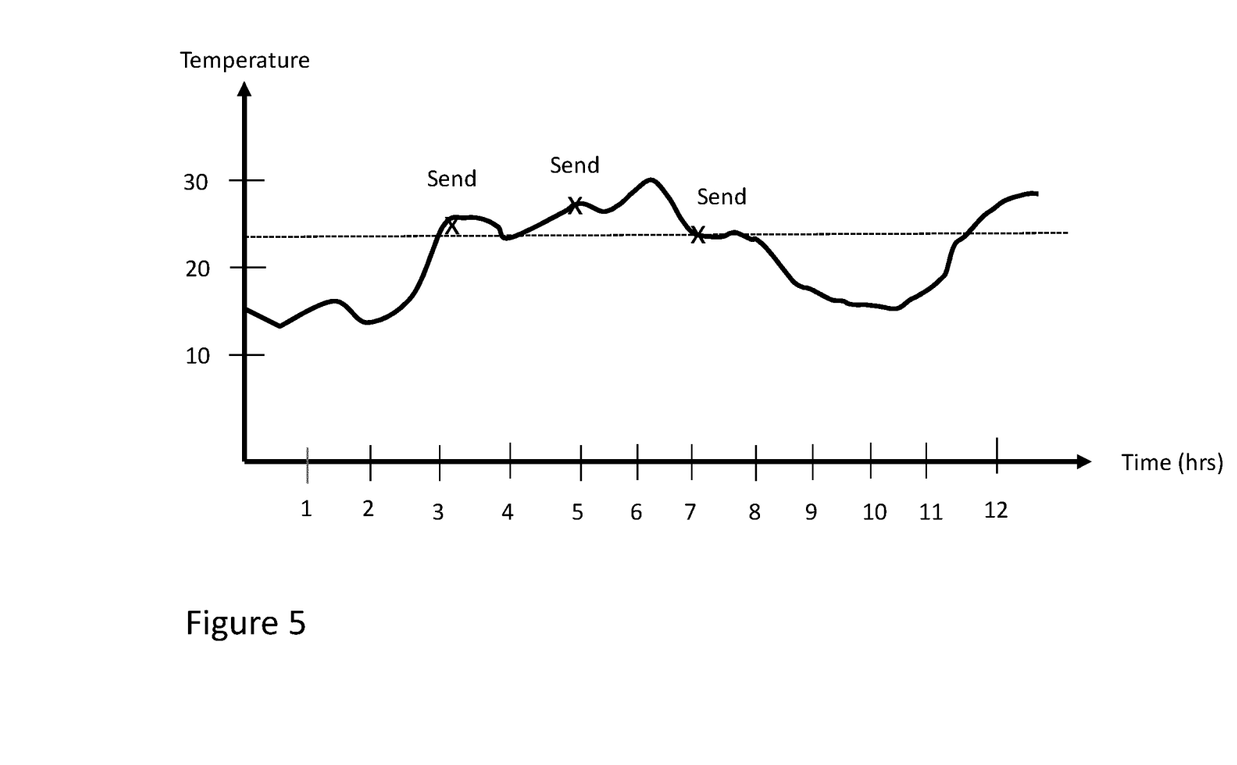
FIG. 5 is a graph of temperature vs. time indicating times for the sending of notifications subject to a time constraint.

Some examples of time constraints will now be described with reference to FIG. 5 which is a graph of temperature in degrees Celsius vs. time in hours indicating SEND times for the sending of notifications subject to a time constraint. Here the resource is temperature and the observation request requires reporting of temperature above 22 degrees Celsius. The client may be configured to sample temperature at regular intervals, e.g. every five minutes. Instead of transmitting a notification at the resource sampling frequency, the observation request may specify a minimum time window between notifications, for example a 2 hour time window in the example of FIG. 5. Therefore, as shown in FIG. 5, although the temperature may remain at over 22 degrees or fall and return to a temperature above 22 degrees, after a first SEND at 3:00 there is not another SEND event, e.g. transmission of a notification, until two hours later at 5:00.

In an observation request as described herein, a resource whose value is to be included in an observation request may be related to the first (trigger) resource, for example by the trigger resource providing some contextual information for a reported resource value. For example, referring back to FIG. 4, another resource that might be a batch resource identified in field 402 is humidity. Therefore each notification transmitted at the SEND times indicated in FIG. 5, may include a current value for humidity. Alternatively the notification may include humidity only, triggered by a change in temperature. Temperature and humidity may be regarded as related resources since humidity may depend to some extent on the temperature. The reporting of humidity only when the temperature exceeds a predetermined value provides some contextual information for the value of humidity without the need for the temperature itself to be reported. Therefore some of the observation requests described herein may reduce the amount of data included in a message in addition to or alternatively to reducing the frequency of notifications. In another example, the respective resources identified in an observation request may be related by power consumption. For example it may be useful to report power consumption values at the same time as another variable that might affect power consumption such as temperature. Some other non-limiting examples of related resources include accelerometer and global position sensor (GPS), software update status and memory-related information (e.g. did an update succeed and how did that impact memory, e.g. heap/stack usage?), software update status and power consumption (e.g. did a software update succeed and how did that affect power consumption?). Other examples of related resources will be apparent to those skilled in the art, for example the trigger resource and another resource identified in the batch resource(s) could be related such that the value of one is affected by a change in the value of the other.

It is not essential for resources identified in an observation request to be related to each other in any way. For example, in some embodiments described further herein, a notification may identify multiple resources for which notifications are correlated in some way, for example by their transmission timing. For example messages may be found to be generated at similar frequencies e.g. within a predetermined margin of each other, or one may be generated at a multiple of the frequency of the other, or notifications relating to different resources may be transmitted at similar times that are not necessarily periodic. The correlation, e.g. similarity of frequency may be coincidental. The correlated messages may be from different, possibly unrelated, objects.

It will be apparent from the foregoing that a trigger criterion may comprise a value or a change in the value of a first resource greater than a predetermined amount. The trigger criterion may be constrained for example by specifying an average value over a predetermined time period, e.g. two hours. Therefore a time constraint may be part of a trigger criterion instead of, or in addition to, being comprised in a separate data field.

The observation request as described here establishes a rule for the transmission of notifications from a client to a server. It may also be considered that the server "subscribes" to the client or object or resource. Several rules may be in operation at the same time. For example another rule, optionally defined in an observation request, may require reporting of the value of a "batched" resource in a separate notification under certain conditions, which may be defined by criteria in a different observation request. A new observation request may override a rule relating to a particular resource, and so for example the transmission of an observation request may automatically cancel an existing subscription to any of the resources identified in the batch resource(s) field 402. Alternatively a separate message may be transmitted to cancel the subscription to each of the individual resources for which the value is to be reported according to the new observation request.

An observation request as described in this disclosure may be transmitted at various times during the operation of a client. According to some embodiments of methods and systems described here, the observation request may be transmitted in response to a registration request received from a client. Additionally or alternatively, another event may prompt the transmission of an observation request. According to some embodiments an observation request including a batch resources field may be transmitted when an opportunity to reduce the frequency of notifications is detected, for example at a server which transmits the observation request or at another entity that notifies the opportunity to a server. An opportunity to reduce the frequency of notifications may also be recognized at a client. In that case the client may report the opportunity to a server and in response the server may transmit an observation request as described elsewhere here. Alternatively it may be possible for a client to transmit a batched notification and thereby reduce the frequency of notifications it sends without requiring an observation request from the server.

One example of such an opportunity will now be described. Other opportunities will become apparent to those skilled in the art.

An opportunity to reduce the frequency of notifications may occur when some kind of correlation is detected, by a client or by a server, between notifications from different resources. In that case an observation request as described here could be transmitted in response to this being noted. The correlation may relate to the timing of transmission of notifications. For example it may be noted that notifications, e.g. in notifications, are received from two or more resources at similar time intervals. Those two or more resources that are triggering notifications at similar times may be identified in an observation request as resources whose values are to be included in a (new) notification, for example identified in batch resource(s) field 402.

Therefore a server such as a LwM2M server, or a client, may be configured to identify at least two resources for which the notifications are correlated. In response, the server may transmit an observation request to the client, with the at least two resources comprising the one or more resources at the client whose value is to be included in the notification. The correlation may be in the timing of the observation or notification messages. For example the server or client may identify resources whose values are being reported in separate notifications at similar frequencies, e.g. within a predetermined margin of each other. A possible server configuration will be described with reference to FIG. 6 which is a flowchart of an embodiment of a method as disclosed here. Some of the operations described with reference to FIG. 6 may alternatively be performed in a client. The work of identifying opportunities to reduce the frequency of notifications may be shared between a client and a server.

It will be appreciated that depending on the nature of the client it may require more memory than it would usually comprise in order to perform some of the operations described here. However some devices may have sufficient resources without the need for modification.

Figure 6:
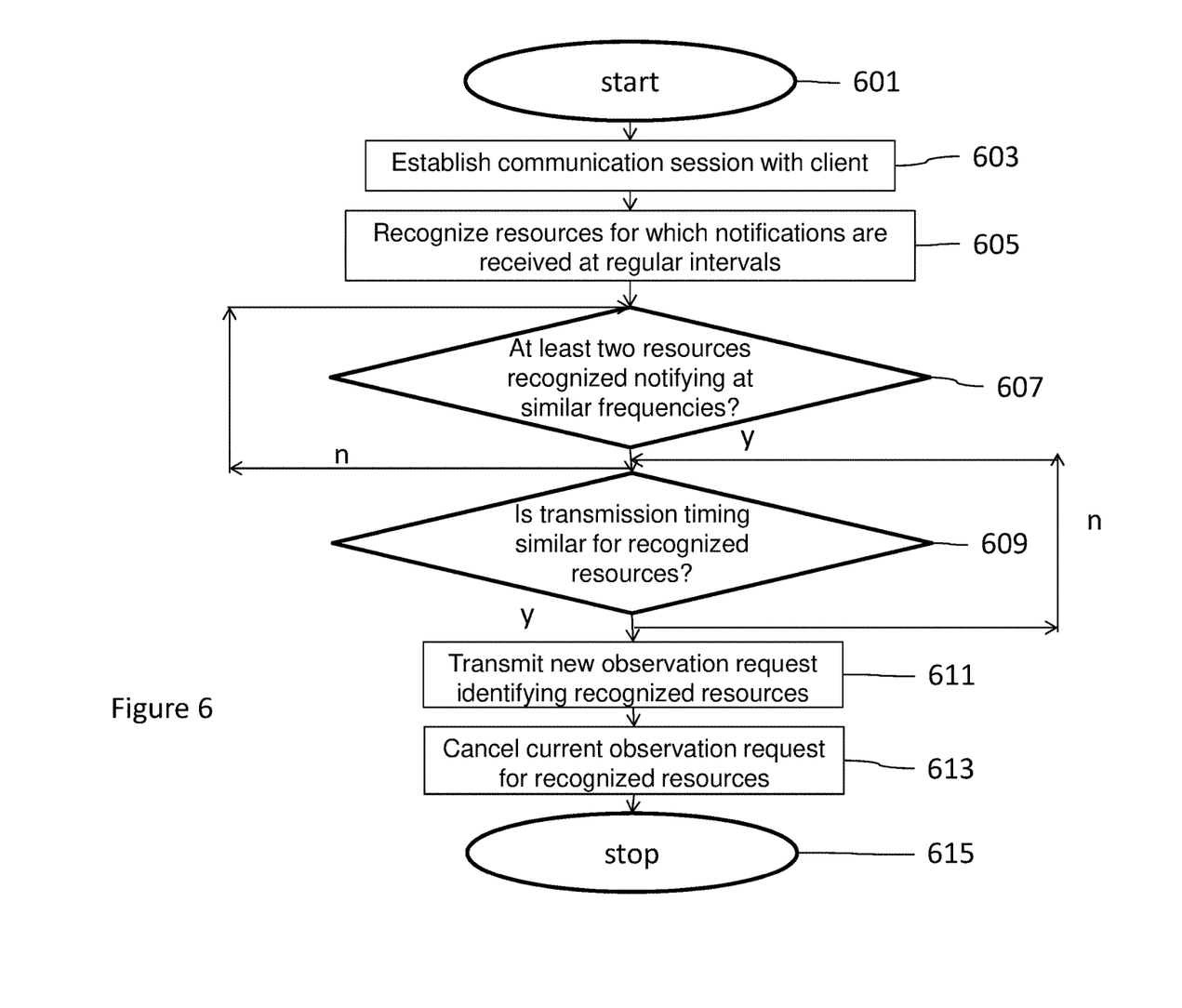
FIG. 6 is a flowchart illustrating an embodiment of a method as described in this disclosure.

In the embodiment of FIG. 6, two or more resources are batched for which messages are recognized as notifying at similar (defined elsewhere in this disclosure) frequencies. As noted elsewhere here, this is one example of correlation between resource notifications or observations and others are within the scope of this disclosure. The method of FIG. 6 may be modified to recognize resources for which the frequency of notification for one is a multiple of the frequency of notification of the other. Such resources may for example be batched such that only some of the notifications for the more frequently reporting resource are replaced by a "batched" notification including a value for the less frequently reporting resource. In other words, an observation request as described herein may only partially replace a previous subscription to a resource.

The server 16 or client 22 may keep track of notifications, corresponding to various resources, for example it may have a list of resources for which subscriptions have been established by the server through the sending of an observation request. Then if notifications for two or more different resources appear to be either synchronized or at frequencies within a predetermined margin of each other, an observation request of the kind described herein, for example including a batch resources field 402, may be transmitted to the client associated with the resources. Referring to FIG. 6, after initialization at operation 601, the server and client may establish communication using any mechanism, for example compliant with the LwM2M standard, indicated at operation 603 from the server perspective, for example including the sending of a registration request message from the client 22 to the server 16.

In some implementations, an observation request, e.g. the same observation request, may be transmitted to more than one client device. This is possible because software running on a given device type may be the same or sufficiently similar. For example the software running on device type (e.g. ACME Streetlight Controller v1.24) is identical. This can lead into situations where the devices behave identically in some aspects.

Therefore a behaviour pattern learned from a specific device, for example relating to the sending of notifications, can be used to verify behaviour pattern of another device of identical type and software version AND/OR expedite the learning process of the behaviour patterns of another device of identical type and SW version.

As a result of the possibility to verify the behavior pattern of one device based on that of another leads to another, there is also disclosed here an automatic mechanism to detect malfunctioning/misbehaving devices caused either by internal or external factors (such as hardware failure, malicious attacks on the security of the device or unforeseen environmental factors).

The detection of resources "in synch" or at frequencies within a predetermined margin may be implemented in various ways that will be apparent to those skilled in the art and may be performed at a server or at a client. In one possible implementation, this may be done in two stages, namely a first stage of recognizing notifications that repeat at regular intervals, e.g. the same interval within a predetermined margin, indicated as operation 605, for example with (almost) invariable frequency as explained further below, and a second stage including determining whether the frequencies for two or more resources are similar, e.g. within a predetermined margin, indicated as operation 607, to be described in more detail below. The detection process is not limited to the method shown in the flowchart and other methods for identifying in synch resources will be apparent to those skilled in the art.

A useful scaling factor in determining regularity is round trip time or RTT. It is measured as the time it takes to send a packet from A->B->A. RTT has the advantage of scaling automatically to each deployment and specific technology used for the communication. For example a limit of ½RTT may be used to qualify "regularity". A number of alternative options are possible including but not limited to: a) complex with strong statistical backing: if the n th percentile limit of standard deviation is more than ½RTT distance (time) from the distribution mean of the notification intervals where the exact value of n can be configured, therefore the interval is not regular or: b) if any of the measured notification intervals within the sliding window of sampled intervals (where the window size in configurable) is more than ½RTT distance (time) from the average interval within the sample window, therefore the interval is not regular. Another, supplemental trigger for non-regular classification could be if any of the notifications are detected arriving in non-sequential order. For example, the notifications may carry a sequence number or other order indicator and notifications arrive out of order if e.g. sequence number x+1 arrives before x or x-1 it may be assumed that the interval data is not good enough, e.g. due to issues in the transport (external factors) thus leading to a conclusion that regularity cannot be determined.

The first stage, operation 605, would be carried out independently for each resource and may comprise detecting notifications and tracking their frequency. Table 1 below is a fictional example of results that might be generated

TABLE 1

| Resource path | No. of notifications | First Notification Timestamp | Latest Notification Timestamp | Observed mean interval | Observed standard deviation of interval | Coeff. of variation of interval | Repeating? |
|---|---|---|---|---|---|---|---|
| /sensor/temp | 1123 | 2018-11-08 18.54 | 2019-01-28 13.16 | 6155 | 15 | 0.00244 | Y |
| /sensor/humidity | 1100 | 2018-11-08 18.50 | 2019-01-28 13.12 | 6284 | 13 | 0.00207 | Y |
| /system/ memory_usage | 227 | 2018-11-08 18.51 | 2019-01-02 01.07 | 30449 | 11 | 0.00036 | Y |
| /system/ transmission_failures | 19 | 2018-11-08 18.57 | 2018-12-15 22.57 | 363789 | 14 | 0.00004 | Y |
| /system/alert | 27 | 2018-11-29 20.57 | 2019-01-02 09.57 | 256000 | 110757 | 0.43264 | N |

Statistical methods may be used to classify which of the notifications (from which resources) on any given device are actually repeating with sufficiently stable interval to be considered in the second stage of the process. A margin of frequency variability may be allowed for various operating factors. For example unknown and unpredictable variables such as network latencies may create some variance to the interval between notifications which may be accommodated in determining whether notifications are being repeated with sufficient regularity for the resource to be batched with another resource reporting at a similar frequency. Various other factors may be taken into account, such as but not limited to the criticality of the resource, in determining whether the notifications are to be recognized as regular at operation 605. Statistical methods are particularly useful in evaluating whether the frequency of notifications is sufficiently stable, but other methods may be used. Thus, "regular" as used herein may mean that the interval between messages is the same subject to a predetermined variability margin.

At the second stage, each resource of the list of resource (notifications or notifications) recognized as repeating periodically at operation 605 may be further examined to determine whether it is a) repeating with similar frequency to any other resource as indicated by operation 607 and optionally b) whether the transmission times of the respective resources are already close to each other as indicated at operation 609. Depending on the resource it may be acceptable for the transmission times to be changed provided that the frequency is maintained and therefore operation 609 may not be required.

The second stage may comprise grouping the interval values for each resource using a suitable mechanism. In general this process is often called discretization or databinning in machine learning and statistics. Grouping is efficient especially where the amount of raw data or data points to investigate is very large—for small number of variables a logical comparison of the variable deltas may be most efficient.

If two or more resources are found whose mean notification interval values are closely matched, the values for those resources may be reported in the same notification. This may be initiated in various ways. In the example of FIG. 6, a new observation request as described elsewhere herein is transmitted at operation 611, for example a message as illustrated in FIG. 4, so as to reconfigure the client to send notifications for multiple resources in a single notification. The observation request may be transmitted in response to a server recognizing multiple resources whose values may be reported in the same notification, or it may be in response to this being notified to the server by a client.

The reconfiguration of the client in this way may be conditional on whether the system configuration allows this. For example a system administrator or service/software developer may want to prevent the automatic batching of notifications from certain types of devices. Therefore a system configuration may allow the enabling or disabling of batching notifications as described herein, either partially e.g. for certain resources or devices, or entirely.

As noted elsewhere herein the batching, or contemporaneous reporting of values for multiple resources, may require the cancellation of existing subscriptions or observation requests to those resources in order to achieve the desired saving in message transmission, as indicated by operation 613. The method of FIG. 6 is shown to stop at operation 615 after the establishment of a new subscription. The method of FIG. 6 may additionally comprise receiving notifications from the client that comply with the observation request.

Other possible mechanisms for analyzing notifications and initiating the sending of an observation request as shown in FIG. 6 include but are not limited to machine learning mechanisms.

Figure 7:
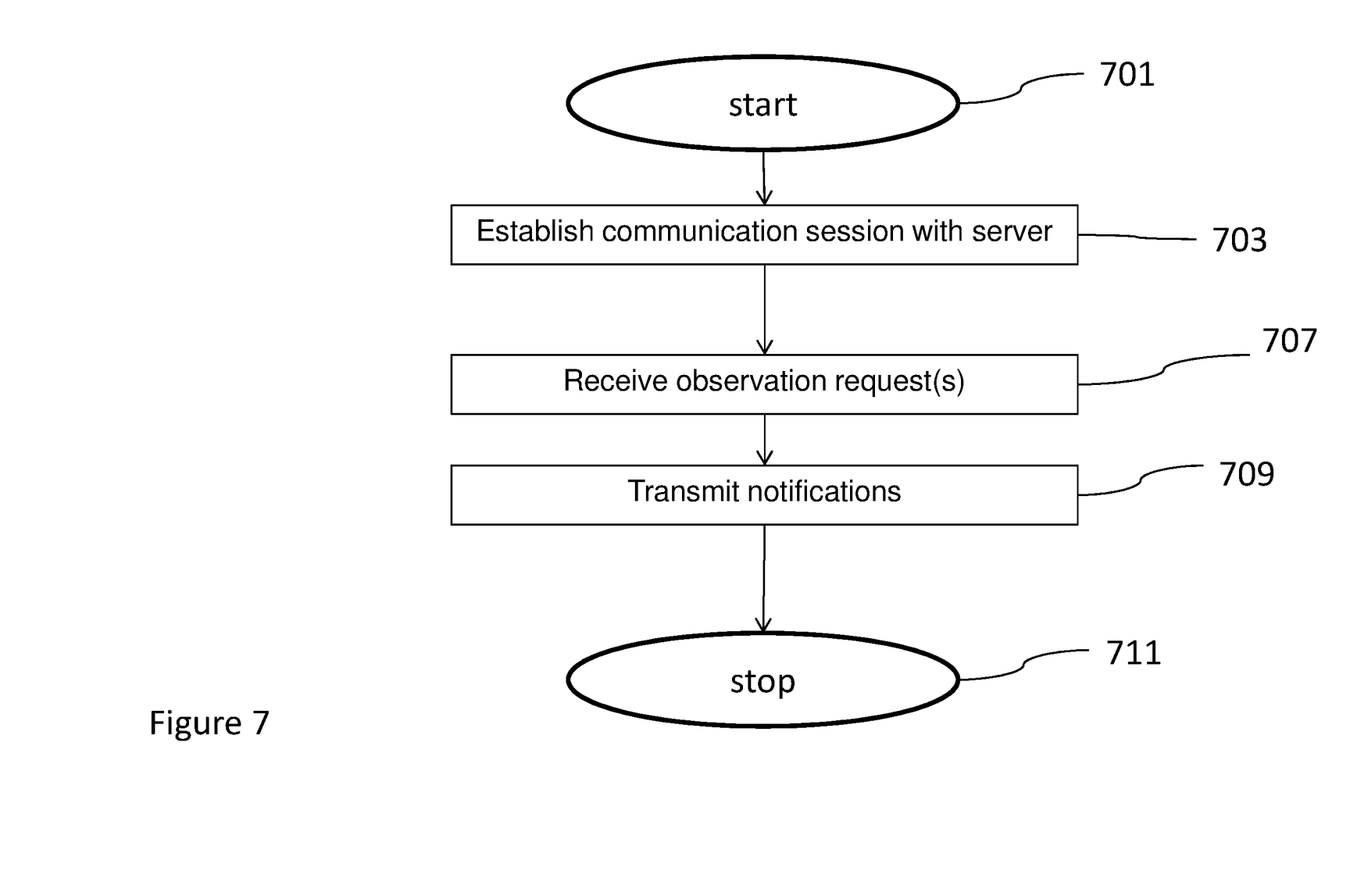
FIG. 7 is a flowchart illustrating an embodiment of another method as described in this disclosure.

There is also disclosed here a method which may be implemented as a client in an IoT device, an example of which will now be described with reference to FIG. 7. Referring to FIG. 7, after initialization at operation 701, the client may establish communication with a server using any mechanism, for example compliant with the LwM2M standard, at operation 703, for example including the sending of a registration request message from the client 22 to the server 16.

The client may then receive an observation request at operation 707, or a plurality of observation requests, of the kind described elsewhere herein, for example identifying at least first resource and a batch resource. Any of the observation requests disclosed herein may be received by a client device.

Having received the observation request(s) at operation 707 the client may transmit notifications in compliance with the observation request(s), for example to the server from which the subscription request was transmitted or optionally to a different entity, e.g. server, which may for example also be identified in the observation request or otherwise identified to the client.

The process ends at operation 711, for example the subscription may be time limited in which case the process may end automatically, or the end 711 may be in response to a stop instruction.

It will be appreciated that any of the methods described herein may be implemented by suitable programming of a processor in a computing system, server or IoT device. Therefore there is disclosed here a transitory or non-transitory data carrier carrying code which, when implemented on a processor, causes the processor to implement any of the methods described here.

It should be noted that embodiments of the apparatus, computer readable media and methods disclosed here do not require direct communication between a client and server. Any number of intermediate communication nodes may be present in a communication path between client and server. Further, an observation request may identify one or more resources of which a value is to be reported either back to the server sending the observation request or to another server or entity.

Apparatus described here includes a computing system configured as a server comprising communication circuitry for performing any of the server methods described here, for example establishing a secure communication session with a client device; and transmitting an observation request to the client device, wherein the observation request identifies:
 a first resource at the client device,
 one or more criteria relating to the first resource to trigger a notification to be transmitted from the client device to the server, and
 one or more resources at the client device, the value of which is to be included in the notification, wherein the one or more resources comprise a resource other than the first resource.

Apparatus described herein includes a client device comprising communication circuitry for performing any of the client methods described here, for example receiving one or more observation requests, wherein the one or more observation requests identify:
 a first resource at the client,
 one or more criteria relating to the first resource to trigger a notification to be transmitted from the client, and
 one or more resources at the client, the value of which is to be included in the notification,
 wherein the one or more resources comprise at least one resource other than the first resource; and in response to receiving the observation request, transmitting notifications including the value of the one or more resources identified in the observation request.

Those skilled in the art will appreciate that while the foregoing has described what is considered to be the best mode and where appropriate other modes of performing or implementing the present techniques, the present techniques should not be limited to the specific configurations and methods disclosed in this description of the preferred embodiment. Those skilled in the art will recognize that present techniques have a broad range of applications, and that the embodiments may take a wide range of modifications without departing from the any inventive concept as defined in the appended claims.

The invention claimed is:

1. A method implemented in a server, comprising:
establishing a secure communication session with a client; and
transmitting one or more observation requests to the client, wherein the one or more observation requests identify to the client:
a first resource at the client,
one or more criteria relating to the first resource to trigger a notification to be transmitted by the client, and
one or more resources at the client, the value of which is to be included in the notification,
wherein the one or more resources comprise at least one resource other than the first resource;
detecting at least two resources of which notifications are correlated, wherein the correlation relates to a timing of the notifications and a frequency of the notifications, the detecting including recognizing resources for which notifications are received at regular intervals and determining whether the frequencies of notifications for two or more resources are correlated;
determining the time of receipt of notifications from said at least two resources, wherein one or more observation requests are transmitted to the client in response to identifying only if a time of receipt for each of said at least two resources is within a predetermined time window; and
transmitting the one or more observation requests to the client in response to said detecting, wherein said at least two resources comprise the one or more resources at the client whose value is to be included in the notification.

2. The method according to claim 1 wherein the first resource is included in the one or more resources whose values are to be included in the notification.

3. The method according to claim 1, wherein the at least one resource other than the first resource comprises a resource related to the first resource.

4. The method according to claim 3, wherein the at least one resource other than the first resource comprises a resource whose value is affected by a change in the value of the first resource.

5. The method according to claim 1, wherein the one or more criteria comprise a value or a change in the value of the first resource greater than a predetermined amount.

6. The method according to claim 1, wherein the one or more observation requests additionally comprises a time constraint.

7. The method according to claim 6, wherein the time constraint comprises a minimum time period between notifications.

8. The method according to claim 1, wherein the one or more observation requests are transmitted in response to a registration request from the client.

9. The method according to claim 1, wherein the one or more observation requests additionally identifies one or more criteria relating to a resource other than the first resource to trigger a notification to be transmitted from the client to the sever.

10. A computer readable medium comprising instructions which when implemented on a processor in a computing system, causes the processor to implement the method of claim 1.

11. A computing system comprising a processor configured to implement the method of claim 1.

12. A method implemented in a client comprising:
establishing a secure communication session with a server;
reporting values of resources associated with the client in notification messages;
detecting at least two resources of which notifications are correlated, wherein the correlation relates to a timing of the notifications and a frequency of the notifications, the detecting including recognizing resources for which notifications are received at regular intervals and determining whether the frequencies of notifications for two or more resources are correlated;
determining the time of receipt of notifications from said at least two resources, wherein one or more observation requests are transmitted to the client in response to identifying only if a time of receipt for each of said at least two resources is within a predetermined time window; and in response to said detecting:
reporting values of said at least two resources in the same notification.

13. A method implemented in a client, comprising:
receiving one or more observation requests, wherein the one or more observation requests identify:
a first resource at the client,
one or more criteria relating to the first resource to trigger a notification to be transmitted from the client to the server, and
one or more resources at the client, the value of which is to be included in the notification,
wherein the one or more resources comprise at least one resource other than the first resource, wherein there are at least two resources of which notifications are correlated, wherein the correlation relates to a timing of the notifications and a frequency of the notifications, and includes recognizing resources for which notifications are received at regular intervals and determining whether the frequencies of notifications for two or more resources are correlated;
wherein the time of receipt of notifications from said at least two resources is determined, wherein one or more observation requests are transmitted to the client in response to identifying only if a time of receipt for each of said at least two resources is within a predetermined time window; and
wherein said at least two resources comprise the one or more resources at the client whose value is to be included in the notification;
and in response to receiving the observation request, transmitting notifications including the value of the at least two resources identified in the observation request.

14. The method according to claim 13, wherein at least one resource other than the first resource comprises a resource related to the first resource.

15. The method according to claim 14, wherein the at least one resource other than the first resource comprises a resource whose value is affected by a change in the value of the first resource.

* * * * *